(12) United States Patent
Srybnik et al.

(10) Patent No.: US 7,388,302 B1
(45) Date of Patent: Jun. 17, 2008

(54) HYDRO-ELECTRIC POWER GENERATING SYSTEM WITH AN ADJUSTABLE WATER DIVERSION SYSTEM

(76) Inventors: Simon Srybnik, 860 United Nations Plz. No. 31E, New York, NY (US) 10017; Louis Srybnik, 200 Central Park S. No. 21 E, New York, NY (US) 10019

( * ) Notice: Subject to any disclaimer, the term of this patent is extended or adjusted under 35 U.S.C. 154(b) by 0 days.

(21) Appl. No.: 11/880,488

(22) Filed: Jul. 23, 2007

(51) Int. Cl.
*F03B 13/08* (2006.01)

(52) U.S. Cl. .............................. 290/54; 290/43; 415/3.1

(58) Field of Classification Search .................. 290/42, 290/43, 44, 53, 54, 55; 415/3.1, 4.3
See application file for complete search history.

(56) References Cited

U.S. PATENT DOCUMENTS

| | | | |
|---|---|---|---|
| 194,826 A | 9/1877 | King | |
| 1,074,292 A | 9/1913 | Reynolds | |
| 1,368,454 A | 2/1921 | Rebman | |
| 1,396,994 A | 11/1921 | ten Bruggen Cate | |
| 3,807,890 A | 4/1974 | Wright | |
| 4,023,041 A | 5/1977 | Chappell | |
| 4,057,270 A | 11/1977 | Lebost | |
| 4,241,283 A | 12/1980 | Storer, Sr. | |
| 4,278,895 A | 7/1981 | Cros | |
| 4,295,783 A | 10/1981 | Lebost | |
| 4,301,377 A | 11/1981 | Rydz | |
| 4,352,990 A | 10/1982 | Aucoin, Jr. | |
| 4,511,808 A | 4/1985 | Joest | |
| 4,540,313 A | 9/1985 | Broome | |
| 4,804,855 A | 2/1989 | Obermeyer | |
| 5,136,174 A | 8/1992 | Simoni | |
| 5,420,463 A | 5/1995 | Agostino | |
| 5,440,175 A | 8/1995 | Mayo et al. | |
| 5,882,143 A | 3/1999 | Williams, Jr. | |
| 6,109,863 A | 8/2000 | Milliken | |
| 6,208,037 B1 | 3/2001 | Mayo et al. | |
| 6,546,723 B1 | 4/2003 | Watten et al. | |
| 6,616,403 B1 | 9/2003 | Smith et al. | |
| 6,930,407 B2 * | 8/2005 | Panholzer ..................... | 290/53 |
| 6,954,006 B2 | 10/2005 | Williams, Jr. | |
| 6,967,413 B2 | 11/2005 | Atiya | |
| 7,042,114 B2 | 5/2006 | Tharp | |
| 7,063,579 B2 | 6/2006 | Voves | |
| 7,084,521 B1 | 8/2006 | Martin | |
| 7,179,045 B2 | 2/2007 | Staggs | |
| 7,262,517 B1 * | 8/2007 | Srybnik et al. ................. | 290/54 |

FOREIGN PATENT DOCUMENTS

| | | |
|---|---|---|
| DE | 3324672 A1 | 1/1985 |
| EP | 0 036 453 A1 | 3/1980 |

\* cited by examiner

*Primary Examiner*—Nicholas Ponomarenko (57) ABSTRACT

A hydroelectric power plant for use in flowing bodies of water is described which includes a new spillway canal constructed to enhance the flow of water by increasing the water pressure. Because the canal has the angled feature on both ends, the water flow can be enhanced when backflow conditions exist as well as when primary flow conditions are present. In addition the canal utilizes a unique combination of both traditional and Pelton type water wheels to convert the water pressure to electric power. The canal, the extensions and both types of water wheels are also adjustable in nature to maximize the amount of power obtainable from any given body of water. The adjustments include the ability to be moved relative to the spillway to create differing angles of input and/or output in the actual spillway structure.

20 Claims, 13 Drawing Sheets

WHEEL ARRANGEMENT AS SHOWN WITH WALLS 12a AND 12b REMOVED FOR CLARITY

HYDRO-ELECTRIC POWER GENERATING SYSTEM WITH AN ADJUSTABLE WATER DIVERSION SYSTEM

CROSS-REFERENCE TO RELATED APPLICATION

This application is related to application Ser. No. 11/586,362, filed Oct. 25, 2006, entitled Hydro-Electric Power Generating System, now U.S. Pat. No. 7,262,517.

BACKGROUND OF THE INVENTION

The present invention relates to a hydro-electric power plant system for maximizing the use of water currents incident upon a set or series of sets of wheels connected to an electric current generating system. In addition, the invention also includes a novel water diversion system for additional maximization of the pressure of water generated by a flowing body, having an adjustable feature to maximize the effects of the water pressure delivered to the power plant to compensate for pressure irregularities, thus compensating for fluctuations in the water pressure contained in the system at all times.

With the increased costs of electrical power generation from fossil fuels and the desire to generate energy without increasing pollution, it has become more important to find ways to generate electricity that use existing natural resources. This enhances the ability to add power sources in an economical fashion and to permit new avenues of supply to an increasing population without further burdening the environment. One source of interest is the use of tidal or coastal waterways and, secondarily, in marginally flowing streams.

This invention, therefore, addresses the ability to harness the energy incumbent in flowing water, either in a naturally flowing stream or in a tidal ebb and flow system or a combination of both systems. This is achieved by way of a unique arrangement of water responsive wheel systems solely, or in combination with water channeling devices which enhance the pressure generated by the moving water. With this system, it is now possible to generate electricity from bodies of water heretofore not harnessable.

In the past, most of the hydro-electric power generation has been confined to waterfalls and dammed streams. These systems are highly successful because of the huge amount of pressure generated by the water in those locations, and the readily available ability to turn the turbines necessary to generate electricity. Of secondary interest had always been the ability to effectively harness the energy contained in slower moving river or tidal systems with less inherent pressure for driving the generation equipment.

Reynolds, U.S. Pat. No. 1,074,292, is an example of such a system. Here a series of water wheels in both tandem and in sequence with respect to the water flow is used, each being off-set with respect to each other so as to not interfere with the pressure exerted on any of the wheels in the device. Buoyancy is controlled in this system so that changes in water level can be compensated for, thus allowing the wheels effectiveness to be maintained even during changing conditions. In addition, the wheels are capable of being reversed to accommodate back-flow energy generation when the water direction is reversed. This system is limited by the use of a single type of wheel and no discussion of water flow enhancement techniques is disclosed.

Rebman, U.S. Pat. No. 1,368,454 is an analogous system to the Reynolds disclosure. Here the wheels are connected to a pontoon platform which in turn allows for changes in environmental conditions, depth conditions and the ability to select the number of wheels in use by the insertion of additional modules. In addition, the individual wheels are height adjustable within the modules to allow for further manipulation of the system to derive the maximum from the water flow conditions. Here, too, the system is based on a single type of wheel and the adjustments are made to the system with respect to the water flow instead of making adjustments to the water flow characteristics.

Rydz, U.S. Pat. No. 4,301,377 is another example of a multi-wheel, single type of wheel system attached to a floating support. This reference is more concerned with the shape of the blades in the wheel assembly than the types of wheels or in water pressure control.

U.S. Pat. No. 4,241,283 to Storer, Sr. also discloses a multi-wheel system but also contains a water channeling feature in a spillway that diverts the water to the wheels. Again, the wheels are in series along the longitudinal axis with respect to the direction of the water flow, but here again, each wheel is of the same construction. The spillway here only serves to direct the flow of the water to the wheel arrangement and does not enhance the flow or pressure properties of the fluid stream.

In U.S. Pat. No. 5,420,463, to Agostino, the water is channeled through a spillway but again the water wheels are the same construction and the Agostino spillway is serpentine in design for the purpose of reusing the water along its extent to drive the wheels. A pump, 19, is described as being present at the beginning of the waterway, but there is no description of that pump being used to increase the head pressure of the water entering the spillway. Thus, the characteristics of the water pressure are not altered in the Agostino system, just the water direction.

Jost, U.S. Pat. No. 4,511,808 describes another system containing a pump mechanism; however, this system uses the water wheel structures to drive the pumps, using the pressure thus formed by the pumps to drive the generators.

Simoni, U.S. Pat. No. 5,136,174, uses the water in a canal to drive his water or paddle wheel device, but no mention is made of altering flow characteristics to enhance pressure. In addition, all of Simoni's wheels are identical.

Both Chappell, U.S. Pat. No. 4,023,041 and Tharp, U.S. Pat. No. 7,042,114, are systems for use in open water and utilize positioning systems or compensating systems for directional control to optimize the amount of water incident upon the wheel structures. This concept is directly opposite to one in which the water is channeled to increase pressure on stationary wheels. Similar to these references is Voves, U.S. Pat. No. 7,063,579.

Fluid modification is also described in the prior art. References directed to this concept include Aucoin, Jr., U.S. Pat. No. 4,352,990, Williams, U.S. Pat. No. 6,954,006, King, U.S. Pat. No. 194,826, Lebost, U.S. Pat. Nos. 4,057,270 and 4,295,783, and Cate, U.S. Pat. No. 1,396,994. Of all of these references, Cate does modify the direction of the water prior to contact with the water wheels, but does so to allow for the wheels to be rotated at a 90° angle with respect to the longitudinal axis of the water flow direction.

As described above, although it is known in the prior art to use systems of pluralities of wheels to generate power, pluralities of types of wheels in one system is not known and the modification of the water directional source to enhance pressure in the intermediate portions of the system is also not known.

SUMMARY OF THE INVENTION

It is therefore an object of the invention to provide a hydro-electric power generating system for use in flowing water bodies that maximizes the inherent pressure of the water flow by constriction of the water mass at the proximal end of a canal or spillway with respect to the normal water flow characteristics.

It is another object of the invention to provide a hydroelectric power generating system for use in flowing water bodies to provide a constriction at both the proximal and distal ends of the canal or spillway to permit water constriction during incidents of water flow in the reverse direction to the normal water flow.

It is a further object of the invention to provide a hydroelectric power generating system that generates power by use of a multi-type of water wheel generating system.

It is yet a further object of the invention to provide a hydroelectric power generating system that contains water pressure enhancement means along the longitudinal axis of the canal or spillway.

It is a further object of the invention to provide an improved water channeling device to enhance the pressure characteristics of the system to compensate for fluctuations in pressure delivery to the power plant system.

DESCRIPTION OF THE PREFERRED EMBODIMENT

The preferred embodiments of the instant invention are described in terms of the FIGS. 1-11. Identical elements contained in various figures are designated with the same numeral in each figure.

Figure 1:
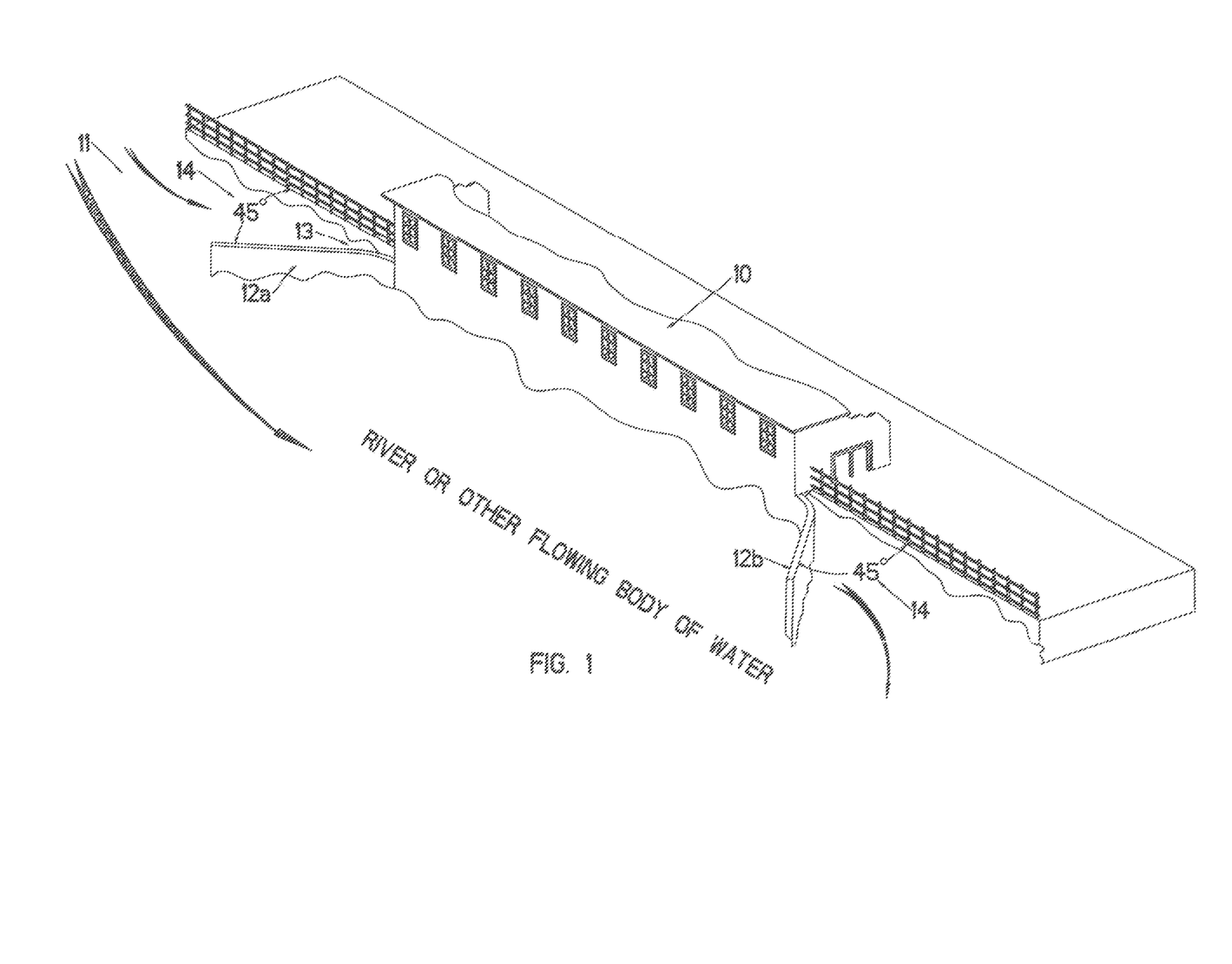
FIG. 1 is an overall view of the power generating plant of the instant invention, showing the location of the canal or spillway feature with respect to the normal flow characteristics of a moving body of water.

Referring now to FIG. 1, the overall design of hydroelectric power plant 10 of the instant invention is shown with respect to a flowing body of water 11. This plant may be in a fixed relationship to a bank feature if the body of water is a river or may be located on a flotation device anchored or otherwise affixed in a medial portion of the body of water. In addition, the power plant 10 may be located on the seashore or moored onto a feature such as a lighthouse, oil rig or other platform in the ocean environment. The specifics of such mooring are not included and would be standard as known to one of ordinary skill in the art.

Figure 2:
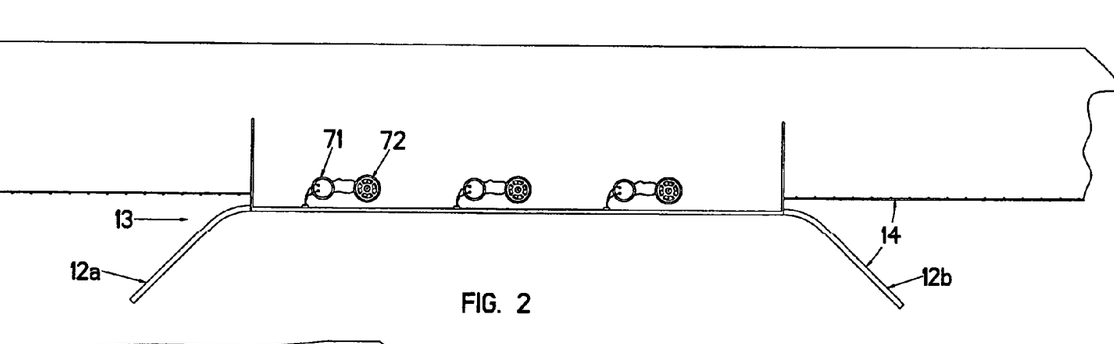
FIG. 2 is an overhead view of the building portion of the power plant showing the relationship of the canal or spillway feature with respect to the longitudinal axis of the plant.
Figure 14:
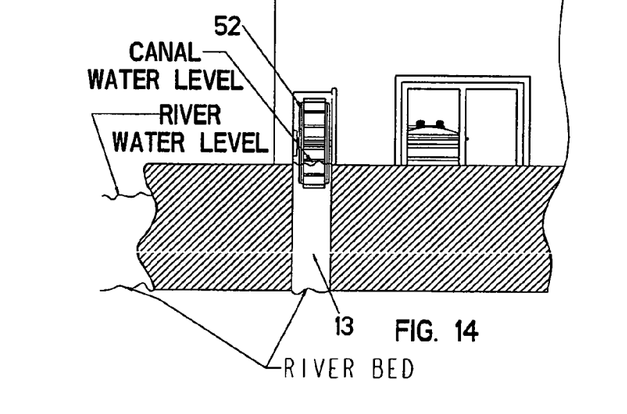
FIG. 14 is a view of the canal feature showing relative water levels present in both the canal and the outside body of water.

As shown in FIG. 1, two walls or extensions 12a and 12b are located at a 45° angle (denoted as 14) with respect to the longitudinal axis of the power plant and serve to funnel the water into the canal or spillway 13. Under normal conditions of river or current flow, water would enter the spillway 13 via the opening defined by 12a which compresses the water to add pressure before contacting the first water or Pelton wheel within the interior of the power plant 10. In the event that water flow is reversed, such as a time when tidal flow properties dominate the current flow, then the water would enter the power plant 10 via the opening defined by 12b which in the preferred embodiment is an exact duplicate of 12a, as shown by FIG. 2. It is considered within the scope of the invention that 12a and 12b can differ in length and width as necessary for any particular application; these modifications are being considered within the scope of those of ordinary skill in the art. In some instances, the capillary action caused by the constriction of the water mass may cause the height of the water in the canal to be higher than that in the water body outside the plant. This feature, shown in FIG. 14, serves to enhance the potential power production available from any given body of water.

In addition to length and width differences, it is also possible to modify the angle 14 to increase or decrease it to maximize the pressure of the water in the spillway 13. This can be done by moving the extensions relative to the longitudinal axis of the power plant, temporarily or permanently. Thus the extensions 12a and 12b may be attached to power plant 10 in either a fixed or movable relationship. Also, the angles defined by extensions 12a and 12b may be the same or different depending on the water flow characteristics. Indeed, if the extensions are movable, then fine adjustments may be made to enhance the water flow characteristics within the system at any time during operation.

If the power plant 10 is used in a milieu where backflow is a feature, then the extensions 12a and 12b may be movable to accommodate the change in conditions. In operation, if water enters at 12a, then 12b may be adjusted to improve the exiting properties and to prevent any eddy currents from developing along the spillway 13.

The extensions 12a and 12b and spillway 13 may be made from any suitable material such as concrete, metal or wood or anything known to those of ordinary skill in the art as suitable for such purposes.

Figure 3:
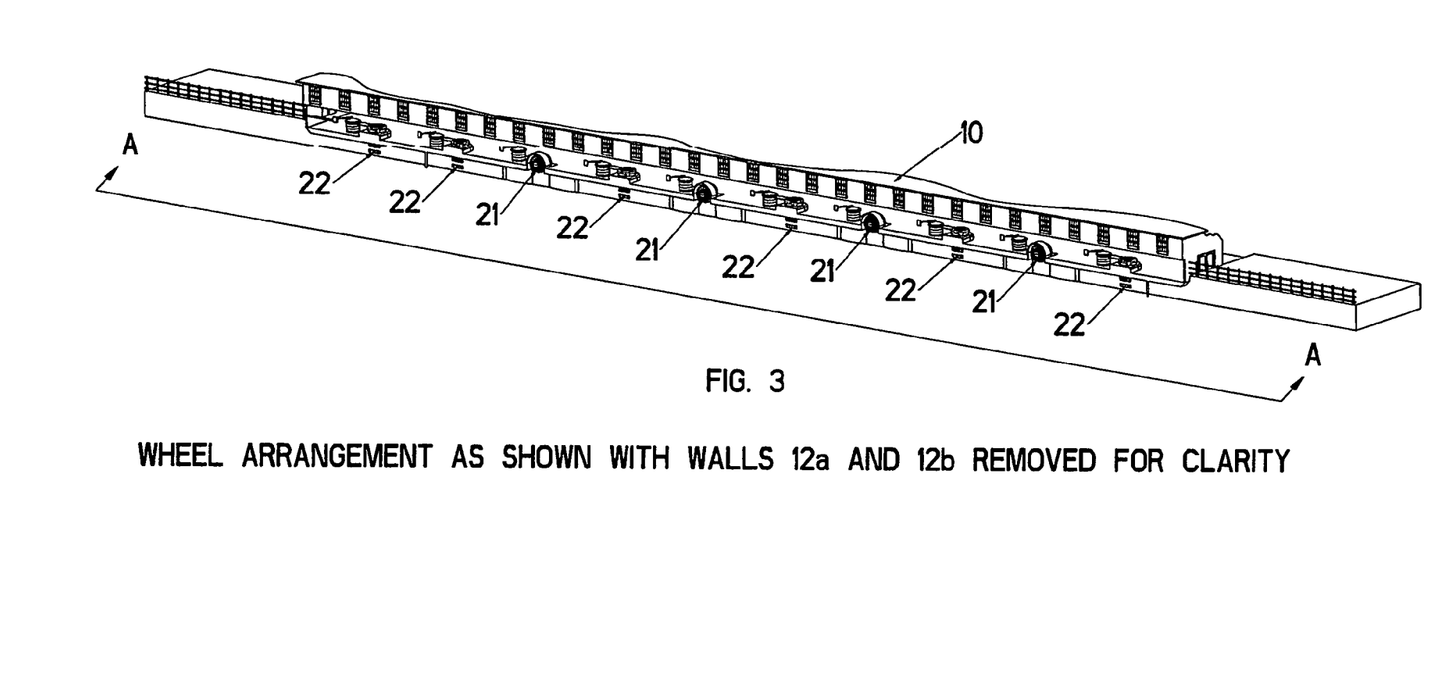
FIG. 3 is another over all view of the power generating plant as seen from the opposite side of FIG. 1 showing the location of the water wheels with respect to the canal or spillway feature and the flow of water in the canal or spillway.

Referring now to FIG. 3, the power plant 10, is shown from the opposite side as shown in FIG. 1. With a portion of the superstructure 20 removed, the features of the water wheels are seen. In this depiction, the wheels are aligned in a single file relationship down the longitudinal axis of the spillway with traditional water wheels 21 alternating with Pelton type wheels 22. The exact ratio of the types of wheels may be 1:1 or may be any other ratio as determined by one of ordinary skill in the art. The arrangement of the wheel varieties may be ordered or random as shown by FIG. 3.

Figure 4:
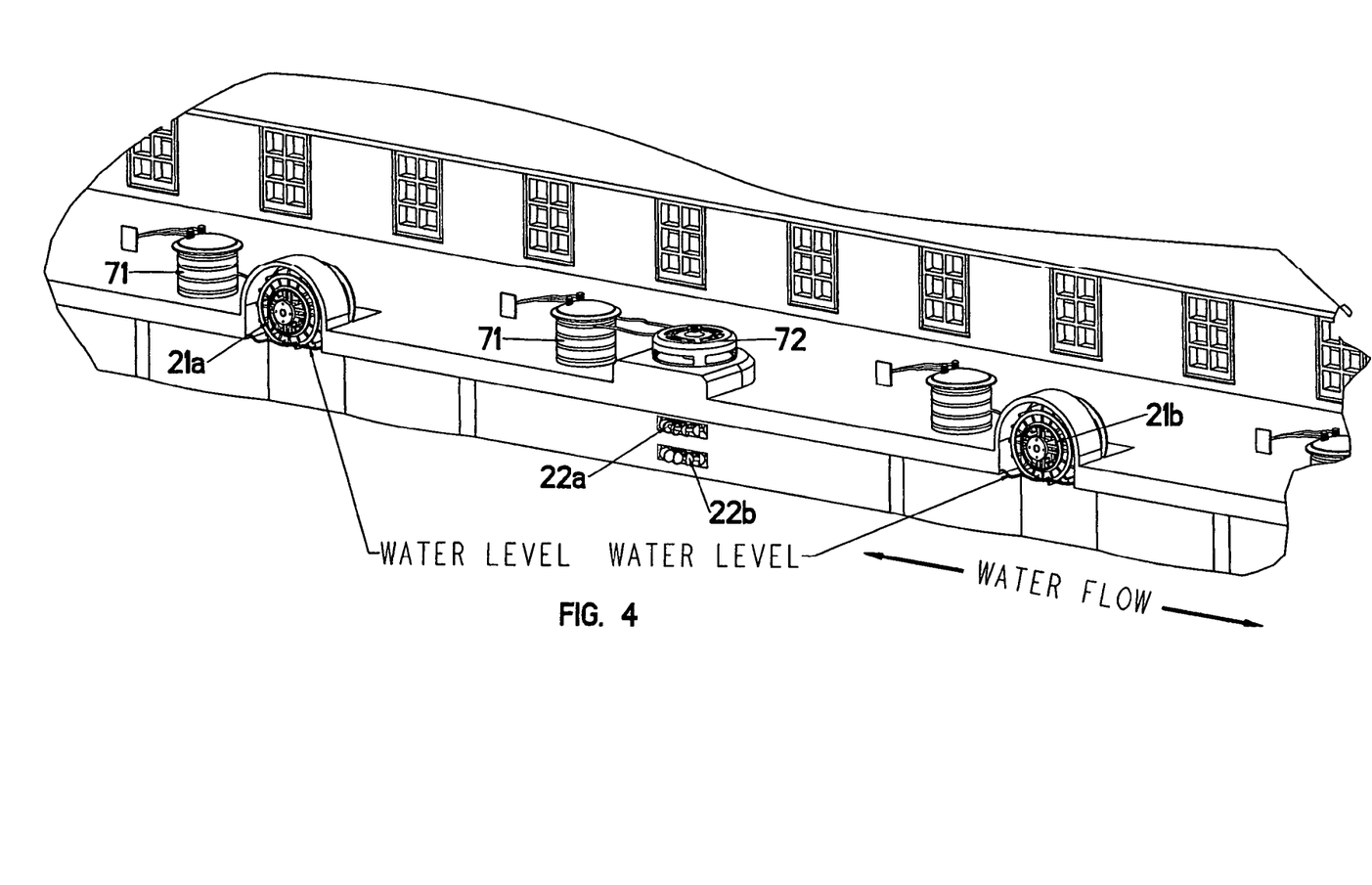
FIG. 4 is an expanded view of the canal and water wheel structures taken along line A-A of FIG. 3.
Figure 12:
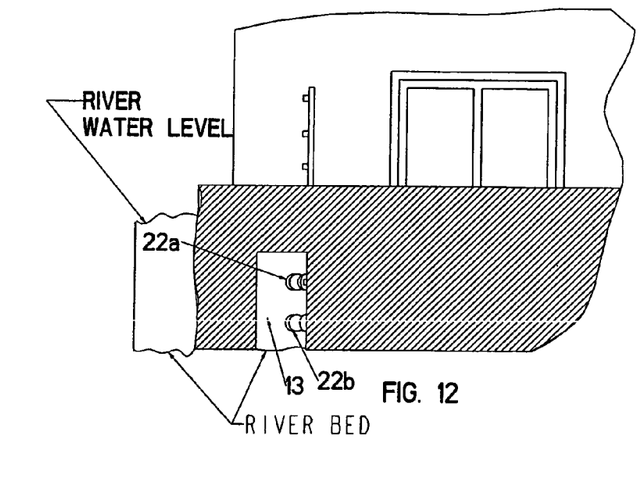
FIG. 12 is a cross-sectional view of FIG. 2, showing the Pelton wheel structures in relation to the surface of the moving water.

An expanded view of the relationship of the two types of wheels is shown in FIG. 4. Here the water wheels 21a and 21b are arranged with Pelton wheel 22a between water wheels 21a and 21b. As shown in FIG. 12, the water wheels 21a and 21b extend downward along the vertical axis of the spillway 13 to contact a portion of the water flowing in the spillway 13. In order to take advantage of the pressure along the remaining portion, as defined by the vertical axis, the Pelton wheel 22a is inserted or located between the water wheels 21a and 21b. In this fashion, most of the usable energy is obtained from the stream of water flowing past the wheel, and any eddy currents derived from the interruption of the water in any of the two types of wheels are consumed, corrected or redirected by being influenced by the differences in motion of the two types of wheels.

Figure 5:
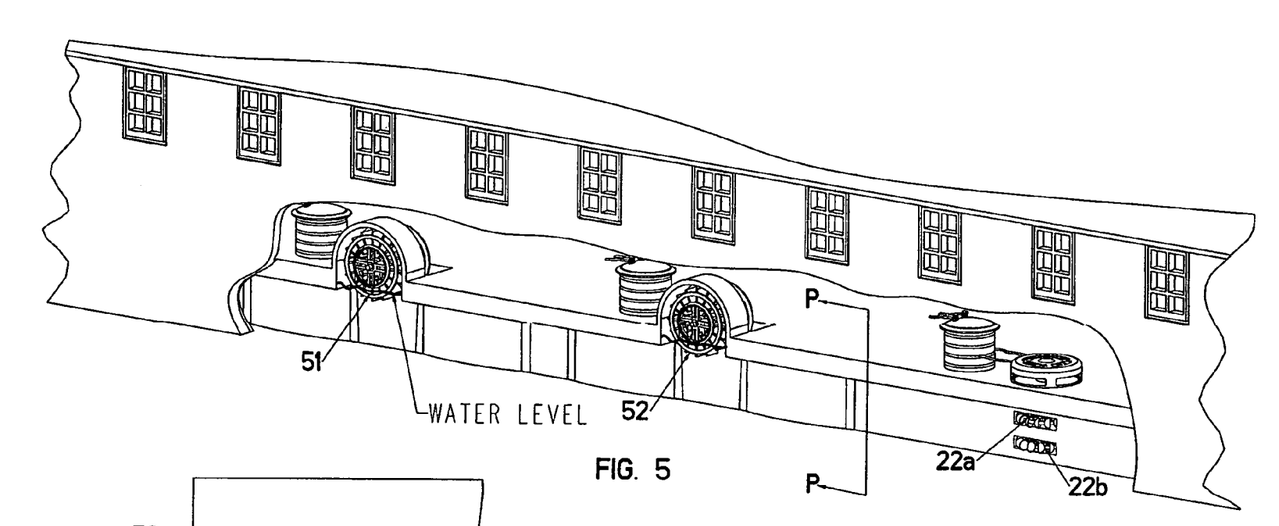
FIG. 5 is another variation of the wheel arrangement as encompassed by the instant invention.

FIG. 5 shows an additional embodiment of the instant invention. Here, the water wheel structures 51 and 52 are in a tandem arrangement with two water wheels in tandem with an alternating Pelton wheel. It is considered with the scope of ordinary skill in the art that any rearrangements of geometries utilizing a plurality of tandem wheels of either variety may be in concert with single or multiple wheels of the alternate variety.

Figure 6:
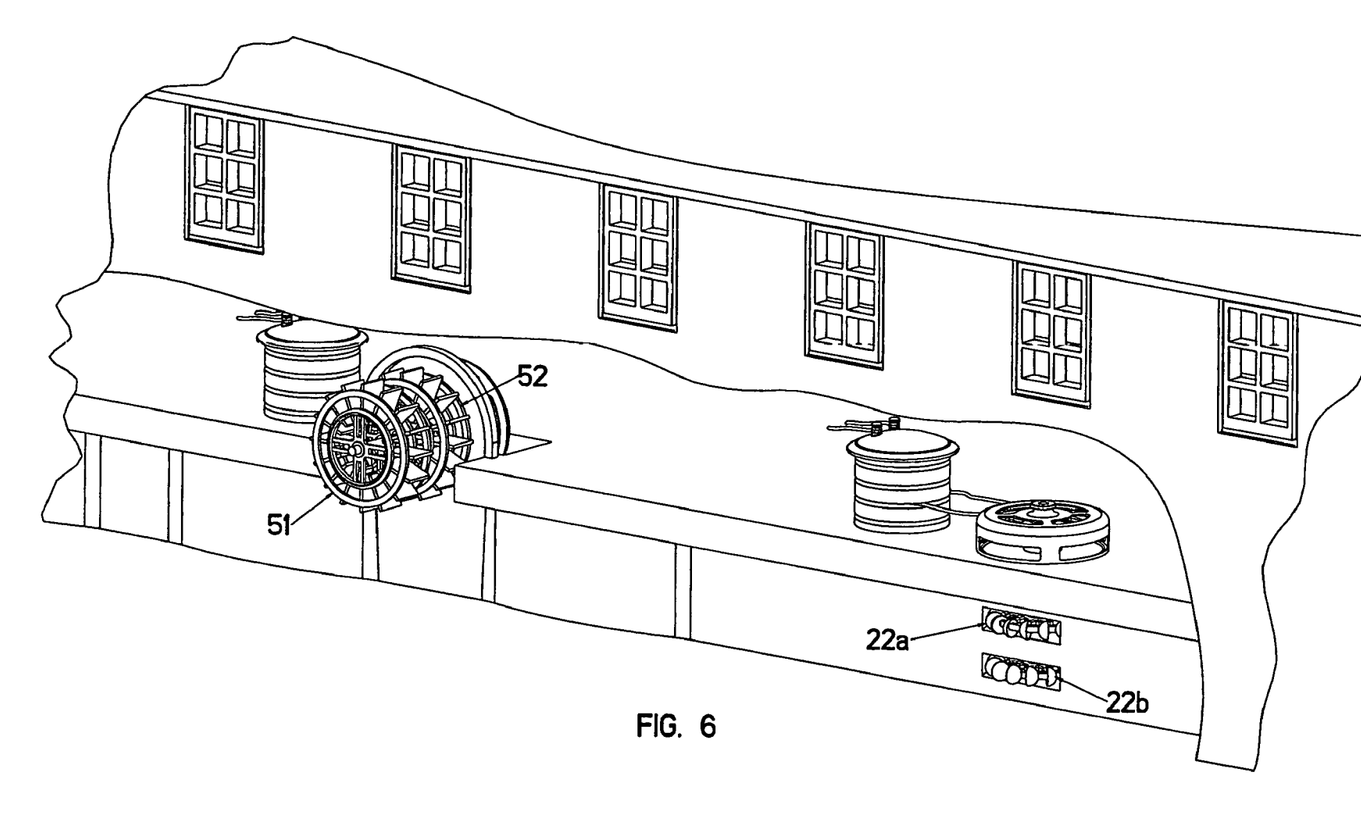
FIG. 6 is a depiction of a modified version of the spillway showing tandem wheel arrangements.

In addition, instead of a total linear arrangement of the water wheels along the longitudinal axis of the power plant 10, it is also within the scope of the invention to couple any of the wheels at any place in the spillway 13. This may be effected on any of the types of wheels or may be done in a random arrangement at any place in the spillway 13. The spillway 13, in order to accommodate this modification, may also be varied in width to maintain good pressure down its extent. This is shown in FIG. 6.

Figure 7:
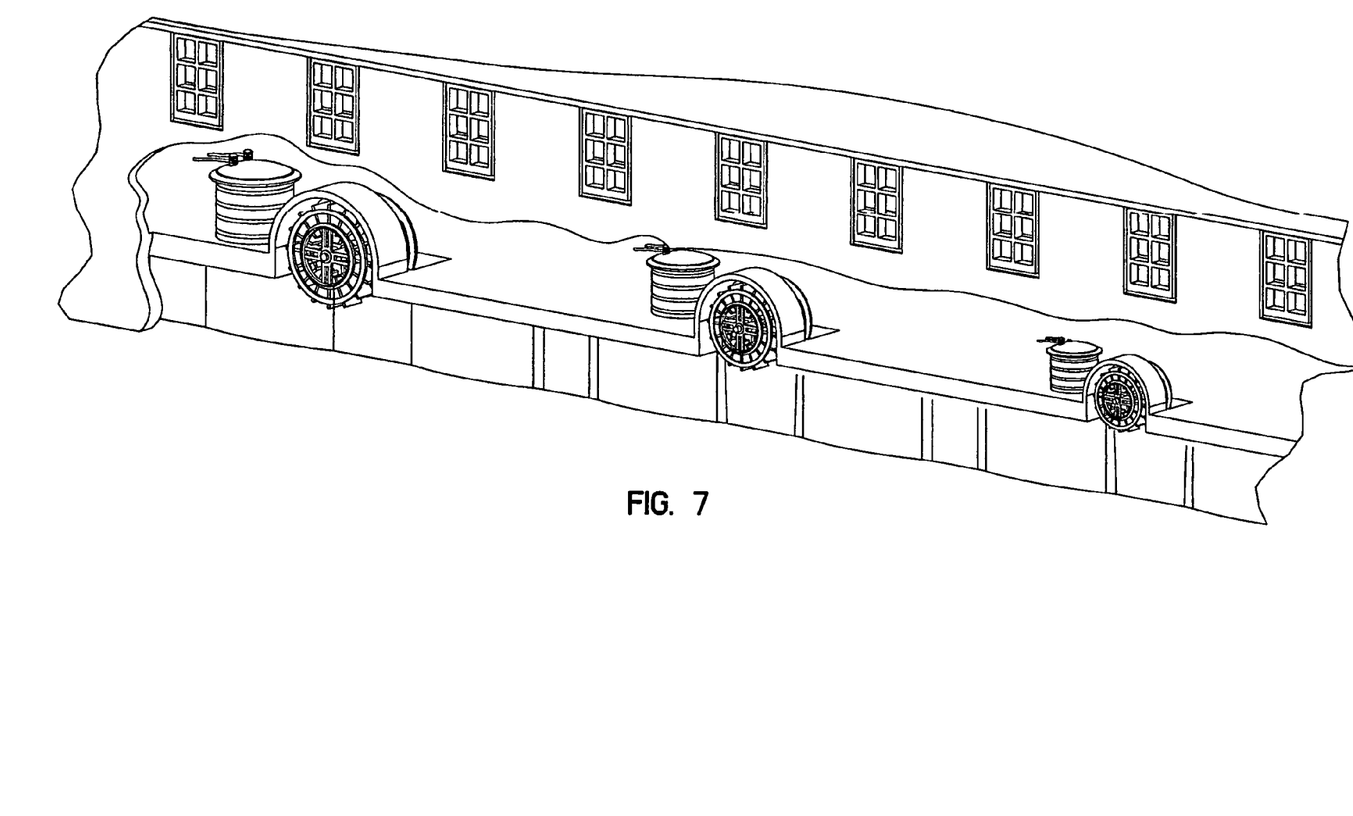
FIG. 7 shows another variation of the spillway and wheel arrangement with varying sizes of wheels.

Additionally, the sizes of the wheels may vary as shown in FIGS. 4 and 7. Here, different size wheels 71 and 72 are used to accommodate pressure declines and differences along the longitudinal axis of the spillway 13. This may occur with both the single row wheel arrangement or in combination with the multi-wheel assembly of FIG. 6.

Figures 8, 13:
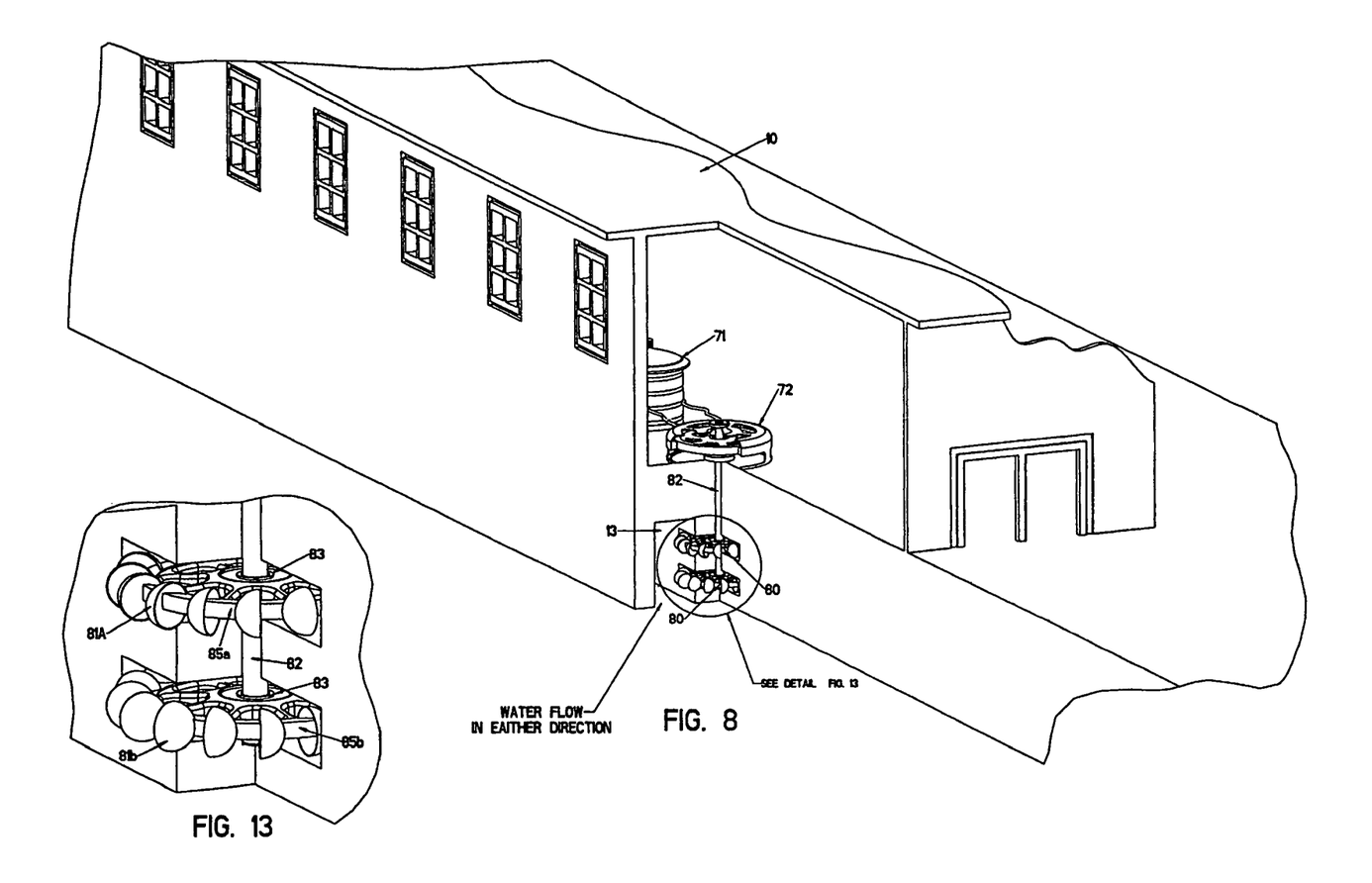
FIG. 8 is an expanded view of one of the Pelton type water wheels of the instant invention.
FIG. 13 is an expended view of the Pelton type wheels shown in FIG. 8.

FIGS. 8 and 13 are showings of the details of a Pelton style wheel 80 usable in the instant invention. The impellers 81a and 81b are cup shaped in this version, but it is considered within the scope of ordinary skill in the art that other geometries may be used. As shown on the drawing, two sets of impellers are arranged on a shingle shaft 82. A clutch mechanism 83 permits selection of the impeller wheel 85a or 85b desired at any given time depending on the water flowing past the wheel 80. Depending on the water flow characteristics, the shaft may contain a plurality of impeller wheels 85 so that maximum water pressure utilization may be made. In addition, the shape of the impellers 81a and 81b can be more suited to clockwise and counterclockwise rotation so that the clutch mechanism 83 may be unnecessary. Again, the Pelton wheels 80 may be identical throughout the power plant system or may vary due to the nature of the pressure fluctuations along the spillway 13.

Figure 9:
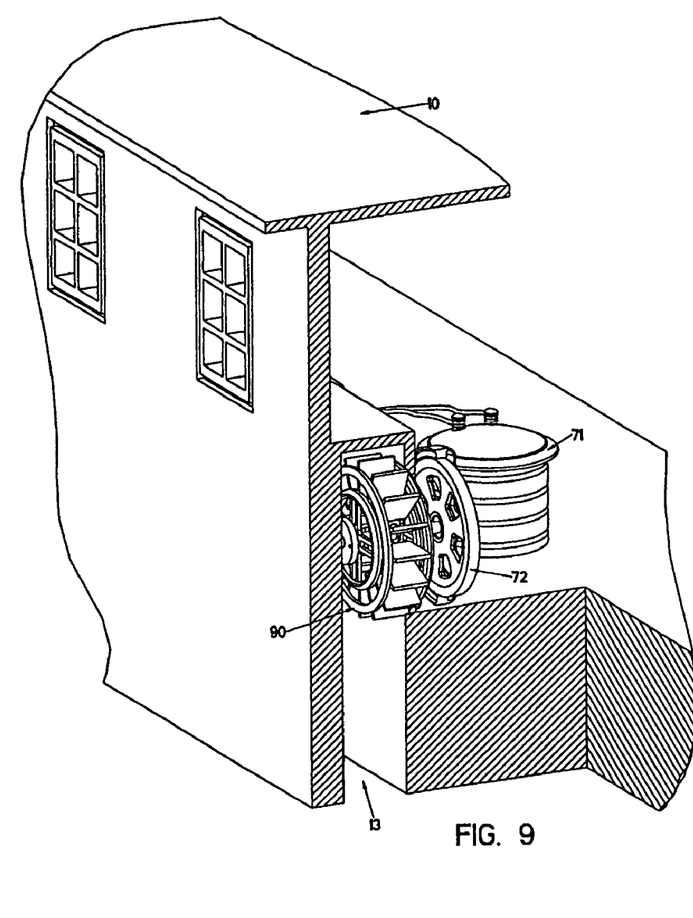
FIG. 9 is an expanded view of one of the paddle wheel type of water wheels of the instant invention.

FIG. 9 shows a rendering of the water wheel version of the wheels used in the instant invention. This water wheel 90 may be any type as known to those of ordinary skill in the art and may have any shape impellers suitable for the particular location of the power plant. As in the Pelton wheel structure, the water wheel 90 may be of any suitable size and the sizes of the water wheels may also vary in the power plant structure. The size variations may be in both radius and width with respect to the latitudinal axis of the spillway 13. In the case of tandem wheels, the wheels may be synchronized or rotate in a dissimilar fashion.

Another feature of the instant invention which may be used solely with a single type of wheel or with the combination wheel structure described earlier is shown in FIG. 10. Here, the spillway 13 is modified along its longitudinal axis to form wider and thinner sections, via indentations 101 in the spillway wall, with respect to the latitudinal axis. As shown, these may be regular in shape or be irregular. By using variations in the walls, the water is re-pressurized after contact with the wheels in the spillway 13 and thus energy consumption is compensated for to an extent so that a large pressure drop is not experienced between the elements of the wheel structures in the spillway 13. In addition the bottom of the spillway may also be modified so that the pressure may be modified in that fashion also.

Figure 10:
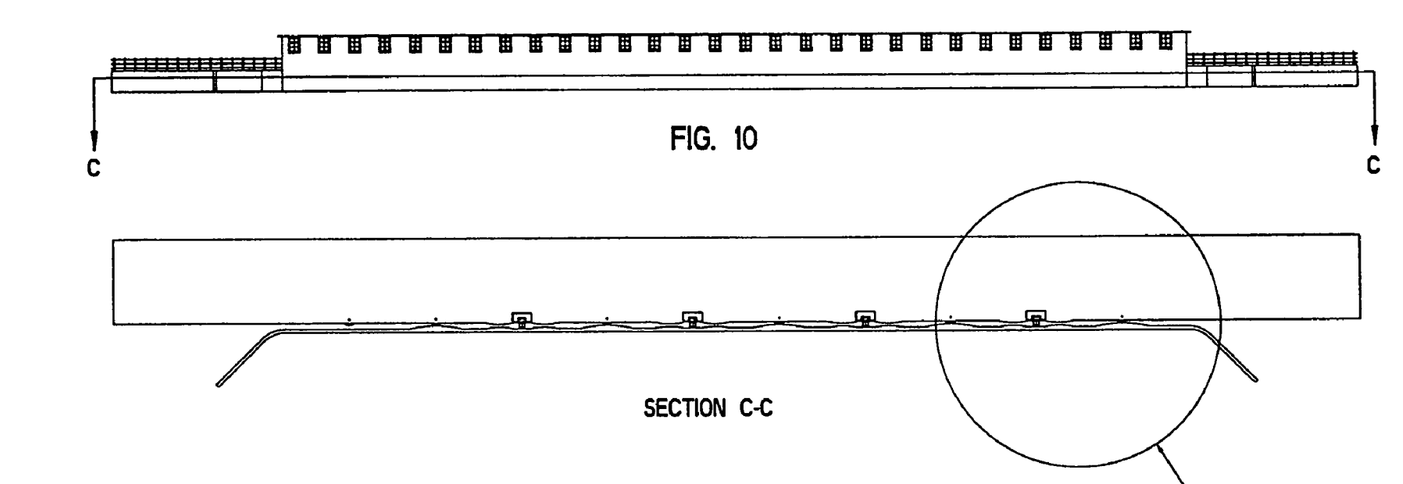
FIG. 10 is an overhead view of the canal or spillway feature of the instant invention taken along line B-B of FIG. 3.
Figure 11:
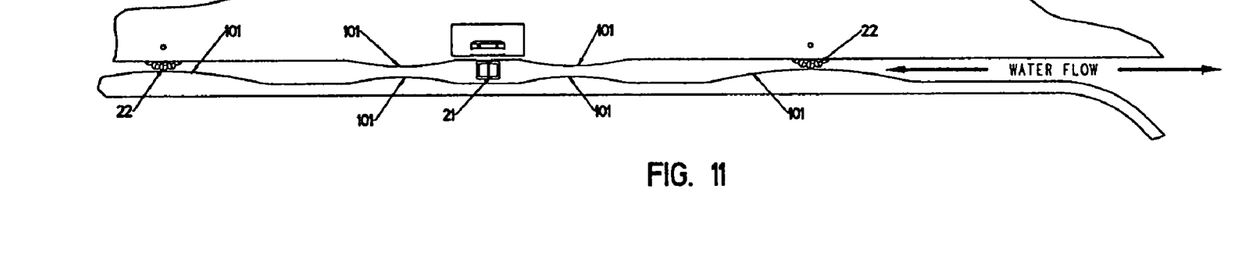
FIG. 11 is an expanded view of section line C-C from FIG. 10.

The preferred angle of modification is again 45° with respect to the latitudinal axis, but other angles are also contemplated. The spillway 13 is also modified so that the indentations 101 perform the same function when the water direction is reversed.

Figures 15, 16, 17:
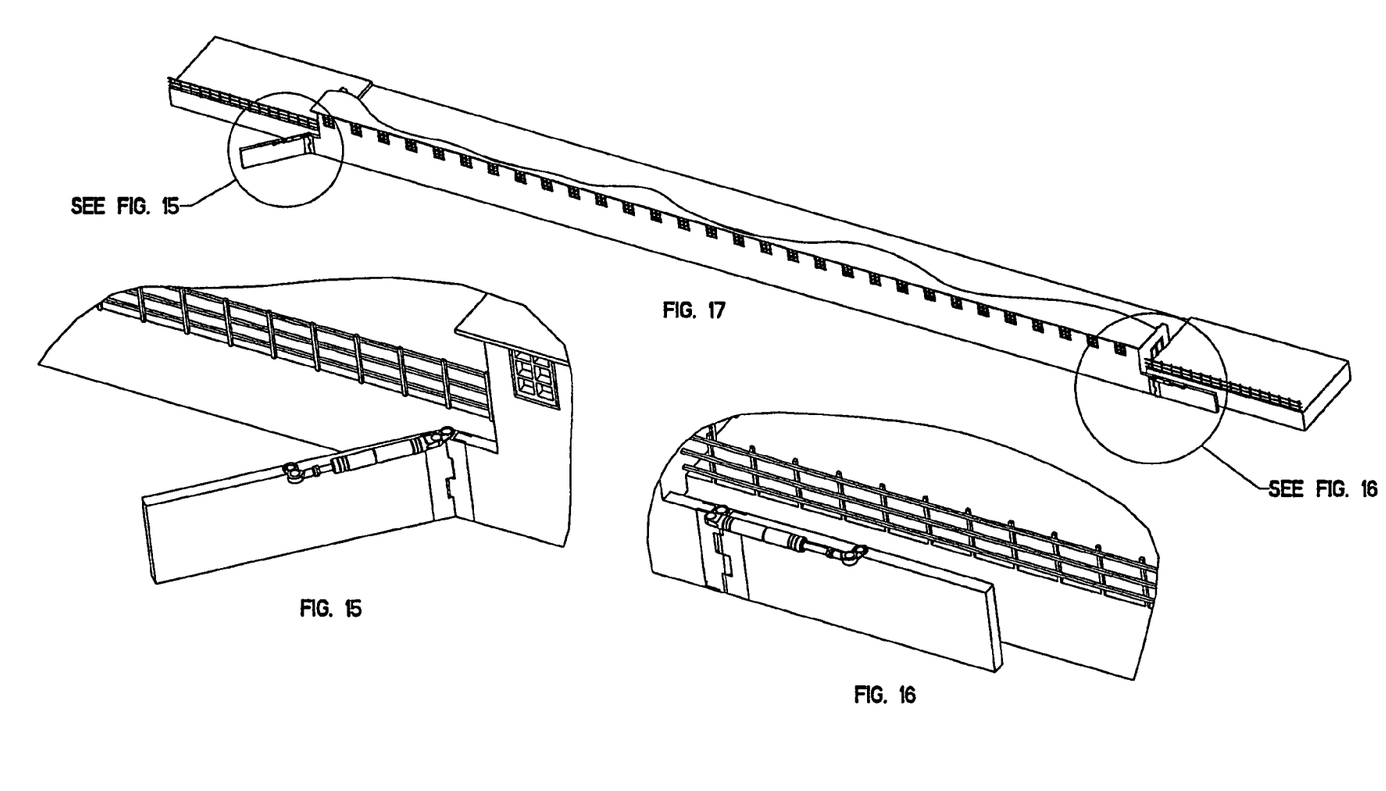
FIG. 15 is a depiction showing one type device for increasing or decreasing the angle of the water channeling feature with respect to the longitudinal axis of the spillway or water canal with the movable wall open at an angle with respect to the longitudinal axis.
FIG. 16 is a depiction showing the device of FIG. 15 with the walls readjusted to a linear configuration.
FIG. 17 shows the power generating plant having two configurations with the movable water channeling devices open to an angle and closed to the linear configuration as shown in FIGS. 15 and 16.

The novel adjustable water channeling features as shown in FIGS. 15-16 are another feature of the instant invention. As shown in FIG. 15, the extensions of the spillway are designed to be movable so that fluctuations in pressure within the body of water may be compensated for. By being able to increase or decrease the amount of water in the spillway system flowing at any time, any changes in flow characteristics in the moving body of water are easily compensated for by creating additional pressure delivered to the system or by creating a back pressure to maintain optimal output characteristics by the water wheels. Thus the hydraulic properties of the water are not as dependent on the flowing stream properties, but are also dependent on the constriction of the channel causing increases and decreases in the flow to maintain an optimal pressure within the power plant generating portion. By moving the inlet and outlet extensions, the amount of water moving within the system is regulated so that the maximum desired pressure within the system is maintained.

By moving the extensions, any changes due to drought, flooding, and tidal water quantities is compensated for without losing plant effectiveness. For instance, if there is a loss of water in the body of water due to drought, then the angles of the extensions may be changed to compensate for the lower amount of water moving in the body of water. Conversely, if a flood occurs, then the plant is capable of regulating the amount of water being taken into the spillway by the movable extension feature. In the case of tidal flowing bodies of water, the same situations occur when the tides are extremely high or low in character.

The actual variation of the angles is dependent on the location of body of water and varies due to the characteristics of that body. Thus the angle changes in one river would be different from those in another. By the same token, a tidal system would also vary dependent on the tidal characteristics of that location. Thus the exact change in the angles would depend on location and is considered within the derivation skills of one of ordinary skill in the art.

The movement devices are also considered a choice to one of ordinary skill in the art and may be an hydraulic lever system as shown in FIGS. 15 and 16, or any other system that would be capable of moving the extensions. In addition, the moving devices may be located on the outside of the extensions 150 and 160, as shown in FIGS. 15 and 16, or they may be devices on the inside of the extensions 150 and 160. FIG. 17 is an example of an internal wheel derived system. Here a rotating wheel on the top of the extension moves it to increase or decrease the angle. In some applications, the moving devices may be located in both the interior and exterior of the extensions 150 and 160. Further choices of location include the tops and bottoms of the extensions themselves with due care being taken to ensure that the moving devices do not interrupt water flow characteristics. The actual mechanical systems for extension movement may be simple or complex in nature and are therefore considered within the scope of ordinary skill in the art.

It is contemplated that the extensions may be moved either singly or in concert so that the pressure delivered to the water wheels is maximized for any changes in water flow conditions. The important feature of the system is the ability to compensate for changes in water flow in the body of water due to the presence of the movable extensions. This makes the instant power plant adaptable to a variety of environments, including those heretofore considered impractical locations. By optimizing the pressure of the water delivered to the wheels in the system, a more constant result is obtained thus increasing the efficiency of the power plant.

Figures 18, 19, 20:
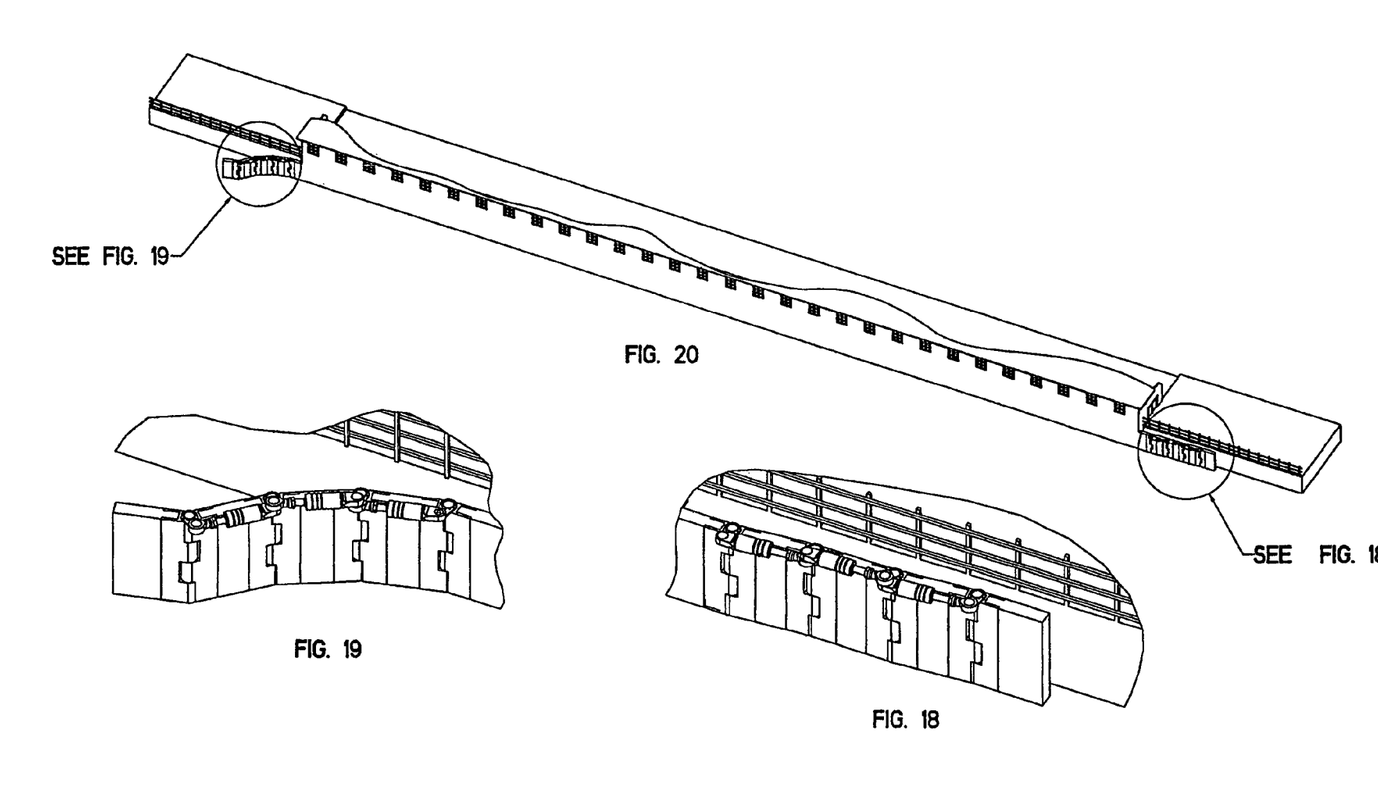
FIG. 18 shows another embodiment with the walls being segmented and in a closed position.
FIG. 19 shows another movable wall concept with an intermediate portion of the wall being moved to create increased spillway pressure.
FIG. 20 shows the relationship of the walls depicted in FIGS. 18 and 19 with respect to the power plant structure.

An additional embodiment of the invention is a segmented extension 180 which is capable of being moved to create another type of effect within the channel defined by the extensions 180 and 190. This embodiment is shown in FIG. 18. Here the water in the exit portions of the spillway is contained to force pressure back into the power plant section thereby effecting an increase of pressure to the water wheels. This structure, when desired, may also be incorporated into the entry section of the spillway as defined by the extensions 180 and 190. By moving a segment only of the entire wall section, the ability to regulate the water flow characteristics with a greater degree of finesse or accuracy is achieved by forming a stylized funnel shape. Here, the ability to make finer adjustments is demonstrated, thus making the water delivered to power plant 10 much better regulated than by simply moving the entire wall extensions 150 and 160 as depicted in FIGS. 15-17.

Figures 21, 22, 23:
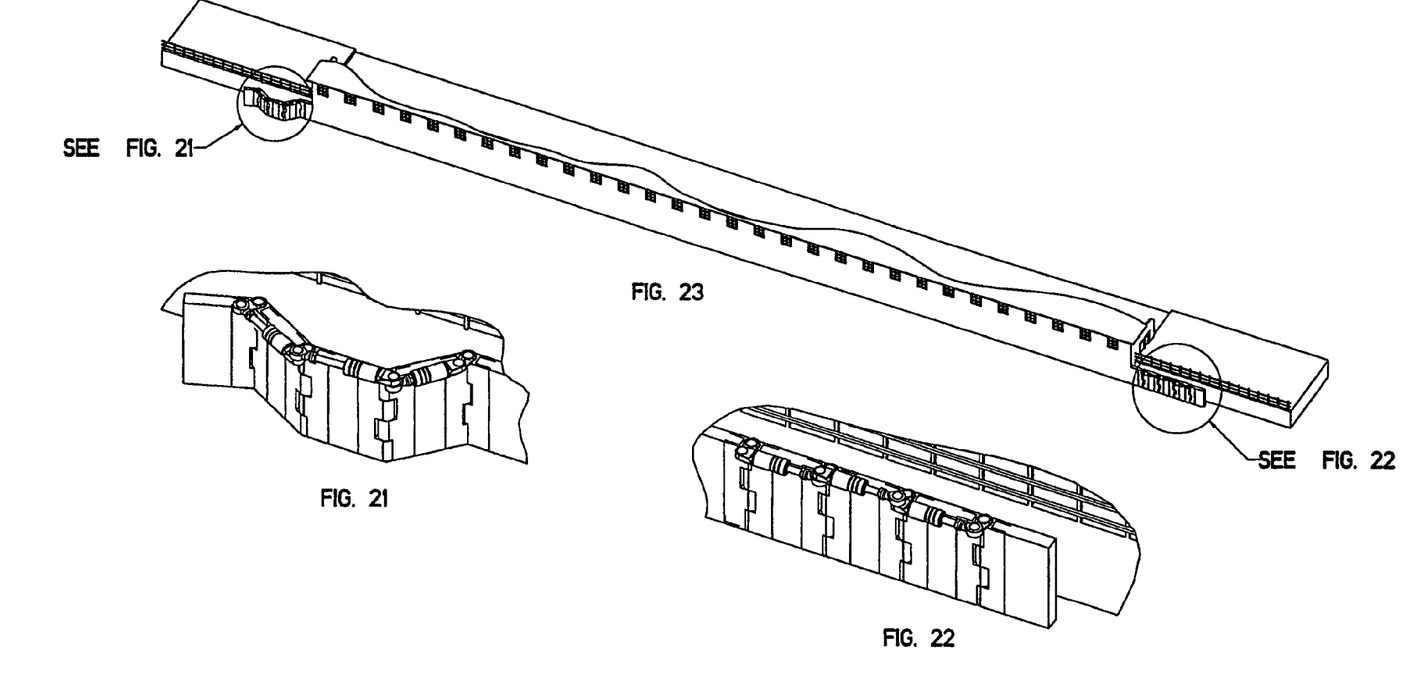
FIG. 21 shows another embodiment of the invention with the walls movable to form a pooling or eddy pool effect.
FIG. 22 shows the wall structure of FIG. 21 in a linear configuration.
FIG. 23 depicts the pool or eddy pool forming wall structure shown as incorporated into the total power plant structure.

A further embodiment is shown in FIGS. 21-23. Here, the segmented extensions 210 and 220 have the capacity to be moved to form a pool 222. This pool 222 or eddy pool structure may be formed to exert back pressure into the water system flowing through power plant 10. The mostly likely location of this pool is on the downstream side of the power plant 10, however, in the event that a decrease in water pressure delivered to power plant 10 is desired, then the pool 222 could also be used in the upstream portion of the entire structure. It is also contemplated that this pool 222 could be present in both the upstream and downstream locations as desired by one of ordinary skill in the art.

The embodiments depicted in FIGS. 15-23 likewise may be used in the upstream as well as the downstream portion of the body of water. In the event that the water in the body of water reverses flow periodically or regularly, this is especially desirable. In addition, the movable extensions may be moved singly or in concert to achieve the optimal flow characteristics. This is true of all the embodiments shown in FIGS. 15-23.

The water wheel system of the instant invention is connected to standard electrical generating and relaying equipment. Because of the variation of the quantity produced at each of the water wheel stations along the longitudinal axis of the power plant 10, the transformers and other pieces of equipment may vary in size and capacity to effectively handle the loads generated at each station.

Modification and variation can be made to the disclosed embodiment of the instant invention without departing from the scope of the invention as described. Those skilled in the art will appreciate that the applications of the present invention herein are varied, and that the invention is described in the preferred embodiment. Accordingly, additions and modifications can be made without departing from the principles of the invention. Particularly with respect to the claims, it should be understood that changes may be made without departing from the essence of this invention. In this regard, it is intended that such changes would still fall within the scope of the present invention. Therefore, this invention is not limited to the particular embodiments disclosed, but is intended to cover modifications within the spirit and scope of the present invention as defined in the appended claims.

What is claimed is:

1. A hydroelectric power plant system for use in a flowing body of water comprising:
   a. a power plant for generation of electric power, the power plant located along flowing water comprising an electric power generating means and a water channeling canal;
   b. two extensions, arranged at predetermined angles radiating outward with respect to the longitudinal axis of the power plant located at the proximal and distal ends of the water channeling canal, these extensions defining a funnel to enhance the pressure and flow of the water in the water channeling canal; and
   c. an extension moving means attached to the extensions to varying the shape of the funnel.

2. The hydroelectric power plant system of claim 1 wherein the angles of the extensions are moved to an angle of 45° respectively with respect to the longitudinal axis of the power plant.

3. The hydroelectric power plant system of claim 1 wherein the intake and outlet extensions are each moved to different angles with respect to the longitudinal axis of the power plant.

4. The hydroelectric power plant system of claim 1 wherein the extensions are adapted to be movable to angles different than 45° relative to the longitudinal axis of the power plant.

5. The hydroelectric power plant system of claim 1 wherein an intermediate portion of an extension is moved to form the funnel shape defined by the extensions.

6. The hydroelectric power plant system of claim 5 wherein the funnel shape is formed on the upstream side of the power plant system.

7. The hydroelectric power plant system of claim 5 wherein the funnel shape is formed on the downstream side of the power plant system.

8. The hydroelectric power plant system of claim 1 wherein the extensions are moved to form an additional pool structure within the water channeling canal.

9. The hydroelectric power plant system of claim 8 wherein the pool structure is formed on the upstream side of the power plant system.

10. The hydroelectric power plant system of claim 8 wherein the pool structure is formed on the downstream side of the power plant system.

11. The hydroelectric power plant system of claim 1 wherein a portion of the electric power generating means comprises a plurality of water wheels located in the water channeling canal.

12. The hydroelectric power plant system of claim 11 wherein the water wheels are both traditional and Pelton type wheels.

13. The hydroelectric power plant system of claim 11 wherein the water wheels are modified to permit maximization of water pressure utilization.

14. The hydroelectric power plant system of claim 11 wherein the Pelton type water wheels are modified to permit maximization of water pressure utilization.

15. The hydroelectric power plant system of claim 11 wherein the traditional and Pelton type water wheel are arranged in alternating relationship.

16. The hydroelectric power plant system of claim 1 wherein the means to move the extensions is located on the outside portion of the extensions.

17. The hydroelectric power plant system of claim 1 wherein the means to move the extensions is located on the inside portion of the extensions.

18. The hydroelectric power plant system of claim 1 wherein the means for moving the extensions is an hydraulic device.

19. The hydroelectric power plant system of claim 1 wherein the means for moving the extensions comprises a plurality of hydraulic devices.

20. A hydroelectric power plant system for use in a flowing body of water comprising:
 a power plant for generation of electric power, the power plant located along flowing water comprising an electric power generating means and a water channeling canal formed by movable extensions, wherein a portion of the electric power generating means comprises a plurality of water wheels located in the water channeling canal, these water wheels being both traditional and Pelton type wheels.

* * * * *